United States Patent
Hasegawa et al.

(10) Patent No.: US 8,276,973 B2
(45) Date of Patent: Oct. 2, 2012

(54) AIRFLOW DEFLECTOR APPARATUS FOR VEHICLE

(75) Inventors: Takumi Hasegawa, Tokyo (JP); Masashi Kitayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/225,761

(22) Filed: Sep. 6, 2011

(65) Prior Publication Data

US 2012/0061993 A1    Mar. 15, 2012

(30) Foreign Application Priority Data

Sep. 10, 2010  (JP) .................................. 2010-202900

(51) Int. Cl.
*B60J 7/00* (2006.01)
(52) U.S. Cl. .................................................. 296/180.1
(58) Field of Classification Search ................ 296/180.1
See application file for complete search history.

(56) References Cited

U.S. PATENT DOCUMENTS 2,367,824 A * 1/1945 King ............................. 280/850
4,640,541 A * 2/1987 FitzGerald et al. ......... 296/180.1

FOREIGN PATENT DOCUMENTS

JP         2008-13013 A     1/2008

* cited by examiner

*Primary Examiner* — Joseph Pape
(74) *Attorney, Agent, or Firm* — McDermott Will & Emery LLP (57) ABSTRACT

An airflow deflector apparatus for a vehicle that protrudes downward from a vehicle body in front of a wheel housing that houses a wheel includes a flap portion having a front surface portion extending substantially in a lateral direction of a vehicle and a vertical direction, and a protrusion portion that protrudes toward a front of the vehicle from the front surface portion of the flap portion and is formed so as to have a shape that tapers toward a protrusion end portion side, in which the front surface portion of the flap portion, when the vehicle is running, changes a moving direction of airflow that flows along a surface of the protrusion portion into a direction away from components that are disposed rearward.

8 Claims, 8 Drawing Sheets

- - - : AREA IN WHICH DRAG IS LARGER THAN OR EQUAL TO SPECIFIED THRESHOLD VALUE

US 8,276,973 B2

AIRFLOW DEFLECTOR APPARATUS FOR VEHICLE

CROSS-REFERENCE TO RELATED APPLICATIONS

The present application claims priority from Japanese Patent. Application No. 2010-202900 filed on Sep. 10, 2010, the entire contents of which are hereby incorporated by reference.

BACKGROUND OF THE INVENTION

1. Field of the Invention

The present invention relates to an airflow deflector apparatus for a vehicle that has a flap portion provided in front of a wheel housing of a vehicle, and in particular, relates to the airflow deflector apparatus for a vehicle that forms airflow in a direction away from rearward components while reduces drag.

2. Description of the Related Art

An airflow deflector apparatus is known that has a flap portion that faces a front side of a vehicle and is provided in front of a wheel housing that houses a wheel in a vehicle such as an automobile. Such a flap receives airflow from the front and then laterally or downwardly redirects the airflow in order to prevent the airflow from striking the wheel and other rearward components at or close to a right angle, thereby reducing drag of the whole vehicle.

In redirecting the airflow as above, since high efficiency is achieved if a front portion of the flap has a planar shape that is perpendicular to the airflow, most of related art uses flaps that are formed so as to have substantially planar shapes.

However, when the flap has such a shape in plan view, drag caused by the flap itself increases due to the airflow striking the front surface of the flap in a substantially perpendicular direction. As a result, an effect of reducing drag of the whole vehicle is diminished.

For this problem, for example, Japanese Unexamined Patent Application Publication No. 2008-13013 discloses a tire deflector as an airflow deflector apparatus disposed in front of a wheel housing. The tire deflector has a horse shoe-like shape in plan view, which is a convex shape extending toward the front side of the vehicle.

Although the above-described related art airflow deflector apparatus reduces drag caused by the airflow deflector apparatus itself, a direction of airflow at each end of the airflow deflector apparatus is substantially parallel to a flowing direction of a relative wind. Thus, it is less likely to obtain an effect of redirecting the airflow in order to make it difficult for the airflow to strike a wheel and the like.

SUMMARY OF THE INVENTION

In view of the above-described problem, an object of the present invention is to provide an airflow deflector apparatus for a vehicle that forms airflow in a direction away from rearward components while reducing drag.

The present invention solves the above-described problem by means described below.

An airflow deflector apparatus for a vehicle according to an aspect of the present invention protrudes downward from a vehicle body in front of a wheel housing that houses a wheel and includes a flap portion having a front surface portion extending substantially in a lateral direction of a vehicle and a vertical direction, and a protrusion portion that protrudes toward a front of the vehicle from the front surface portion the flap portion and is formed so as to have a shape that tapers toward a protrusion end portion side, in which the front surface portion of the flap portion, when the vehicle is running, changes a moving direction of airflow that flows along a surface of the protrusion portion into a direction away from components being disposed rearward.

Thus, by providing the protrusion having a shape that tapers toward the protrusion end portion side, drag caused by the airflow deflector apparatus itself can be reduced.

In addition, by changing the moving direction of the airflow flowing along the surface of the protrusion portion into a direction away from, for example, components disposed rearward such as a wheel using the front surface portion of the flap portion, an increase in drag due to interference of the airflow with the components can be suppressed, and accordingly, air resistance of the vehicle can be reduced.

Furthermore, by providing the protrusion portion, the flow velocity of the airflow flowing outward from the front surface portion of the flap portion can be increased. This can prevent the outward airflow from interfering with main airflow that flows around the airflow deflector apparatus for a vehicle and desirably form airflow away from rearward components.

In the airflow deflector apparatus for a vehicle, it is preferable that the front surface portion of the flap portion, when the vehicle is running, change the moving direction of the airflow flowing along the surface of the protrusion portion so as to increase at least one of a velocity component toward an outer side in the lateral direction of the vehicle, a velocity component toward an inner side in the lateral direction of the vehicle, and a velocity component toward a lower side.

Thus, by redirecting the airflow that strikes the airflow deflector apparatus toward lateral sides or a lower side of the airflow deflector apparatus, direct striking of the airflow on the wheel and the like can be prevented.

In the airflow deflector apparatus for a vehicle, it is preferable that the protrusion end portion of the protrusion portion be disposed at or close to a position where the airflow flows in a direction substantially perpendicular to the front surface portion of the flap portion.

Thus, by providing the protrusion end portion at a position where drag is at the maximum if the protrusion portion is not provided, drag caused by the airflow deflector apparatus can be effectively reduced.

In the airflow deflector apparatus for a vehicle, it is preferable that an area around the protrusion portion on the front surface portion of the flap portion be formed so as to have a substantially planar shape.

Thus, the airflow that strikes the airflow deflector apparatus can be significantly redirected at angles up to substantially close to a right angle, thereby allowing an effect of reducing air resistances of rearward components to be improved.

DESCRIPTION OF THE PREFERRED EMBODIMENTS

The present invention achieves a goal of providing an airflow deflector apparatus for a vehicle that forms airflow in a direction away from rearward components while reducing drag by providing a protrusion portion having an apex at or close to a position where a relative wind flows in a substantially perpendicular direction on a front surface portion of a flap. The protrusion portion has a shape that tapers toward the apex.

Embodiment

An embodiment of an airflow deflector apparatus for a vehicle (simply referred to as the airflow deflector apparatus hereafter) according to the present invention will be described below.

An airflow deflector apparatus 100 of the embodiment is provided in a vehicle 1, which is, for example, a four-wheel vehicle such as a passenger car.

Figure 1:
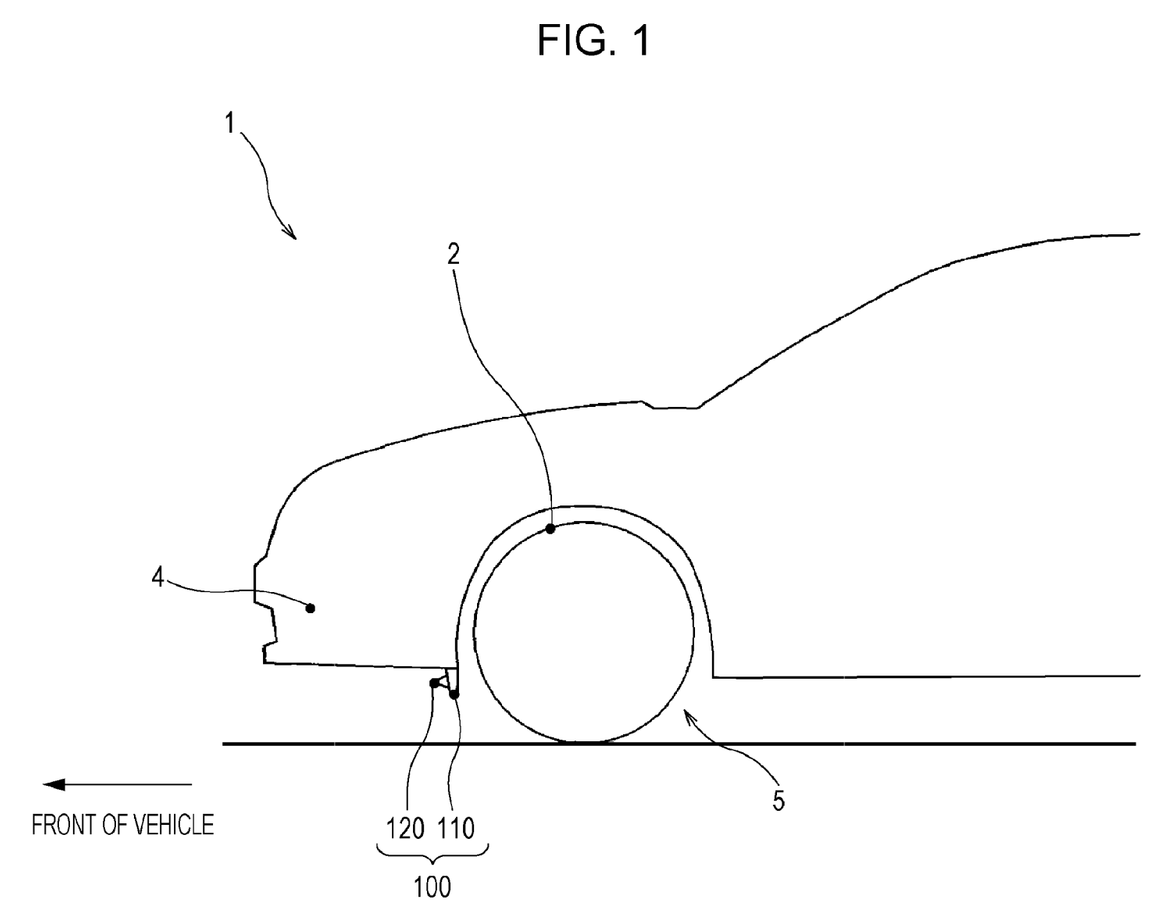
FIG. 1 is a schematic side view of a front portion of a body of a vehicle that includes an embodiment of an airflow deflector apparatus for a vehicle according the present invention.
Figure 2:
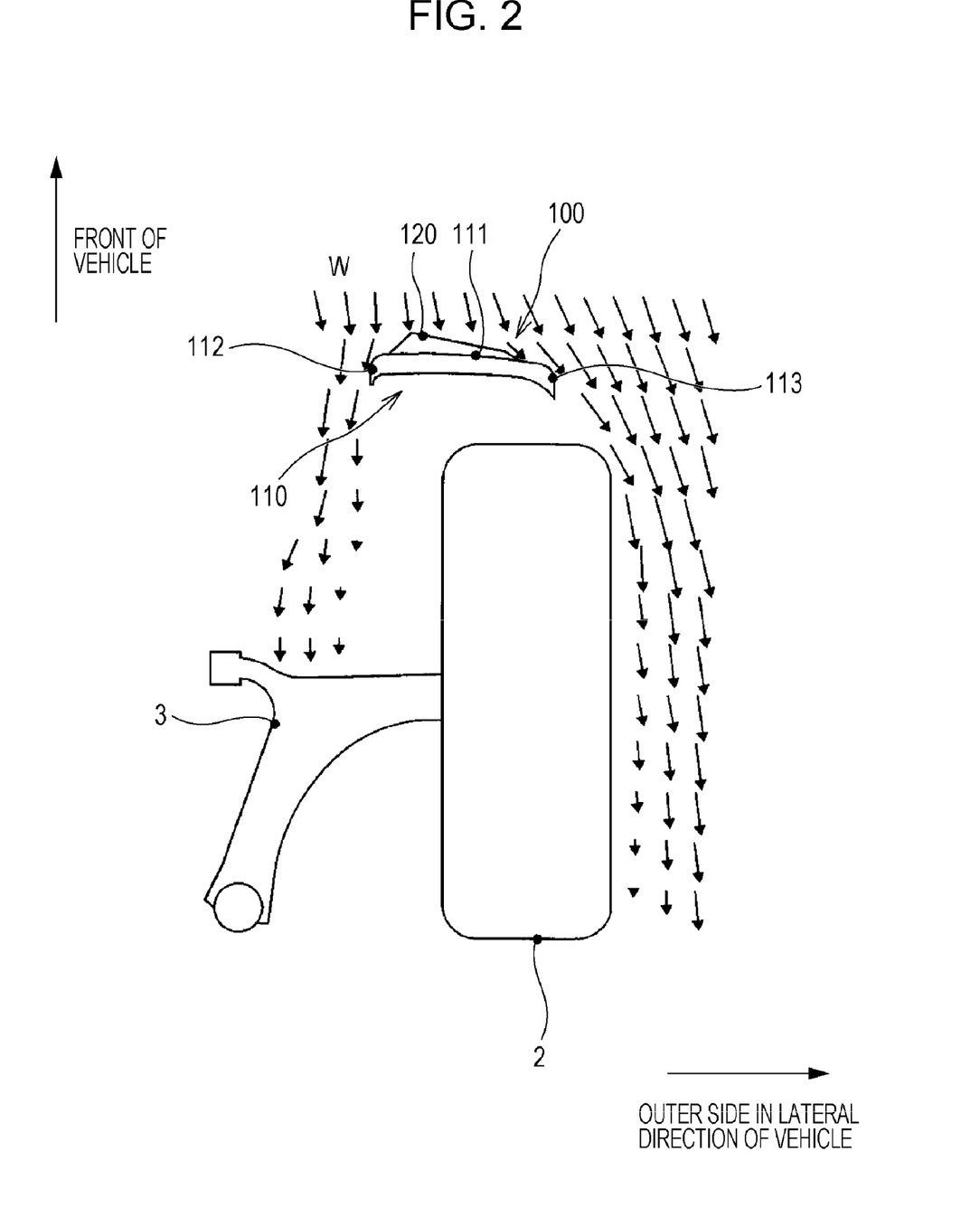
FIG. 2 is a plan view illustrating the positional relationship of the airflow deflector apparatus for a vehicle of the embodiment and a front wheel and a lower arm of the vehicle in a state seen from a lower side, in which the length and the direction of each arrow indicate the velocity and the direction of airflow (this is also true in FIGS. 4 to 7)

As illustrated in FIGS. 1 and 2, the vehicle 1 includes front wheels 2, lower arms 3, a bumper 4, wheel housings 5, and so forth.

The front wheels 2 each include a rim that is formed of steel, aluminum alloy, or the like, and a tire that is engaged with the rim. The vehicle 1 includes a pair of the front wheels 2, that is, the left and right front wheels 2.

The front wheel 2 is supported by a hub bearing (not shown) such that the front wheel 2 is rotatable about an axle. The hub bearing is mounted in a hub bearing housing (not shown). The hub bearing housing is supported by a front suspension such that the hub bearing housing can stroke relative to a vehicle body.

The lower arm 3 illustrated in FIG. 2 constitutes part of the above-described front suspension and serves as a suspension arm that supports a lower end portion of the hub bearing housing.

An end portion of the lower arm 3 on an outer side in a lateral direction of the vehicle 1 is swingably connected to the lower end portion of the hub bearing housing using a ball-joint.

The end portion of the lower arm 3 on the inner side in the lateral direction of the vehicle 1 is connected so the vehicle body using a pair of bushes spaced apart from each other in a longitudinal direction of the vehicle 1 such that the lower arm 3 is swingable to the vehicle body.

The bumper 4 is an exterior member provided in a front end portion of the vehicle body. Out of a relative wind, which is airflow that strikes a running vehicle, part of the airflow out of the airflow flowing below the bumper 4 strikes the airflow deflector apparatus 100, which will be described below, and the front wheel 2 substantially along the longitudinal direction of the vehicle 1.

The wheel housing 5 is disposed at a position behind the bumper 4 and houses the front wheel 2. The wheel housing 5 is open to the outer side of the lateral direction of the vehicle 1 and to a lower side. A lower portion of the front wheel 2 protrudes from a lower portion of the wheel housing 5.

The airflow deflector apparatus 100 is provided in front of the wheel housing 5 so as to protrude downward to a level below a level of a lower portion of the vehicle body (lower end of the bumper 4).

Figure 3:
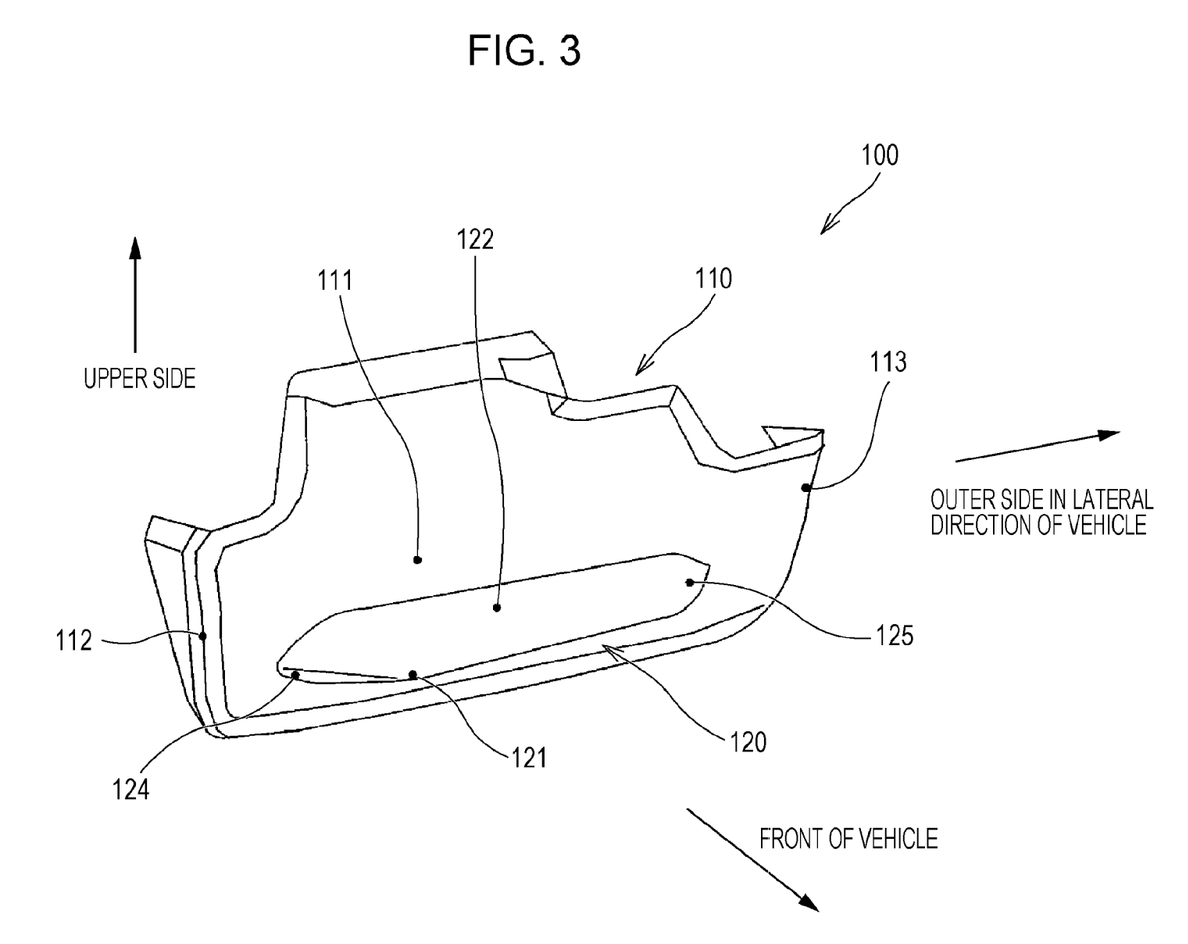
FIG. 3 is an external perspective view of the airflow deflector apparatus for a vehicle of the embodiment.

As illustrated in the drawings such as FIG. 3, the airflow deflector apparatus 100 includes a flap portion 110 and a protrusion portion 120. The flap portion 110 and the protrusion portion 120 are integrally formed of, for example, a resin material by injection molding.

The flap portion 110 protrudes downward from the lower portion of the vehicle body and has a panel-like shape substantially facing the longitudinal direction of the vehicle 1.

The flap portion 110 includes a front surface portion 111, an inner end portion 112, an outer end portion 113, and so forth.

Figure 5:
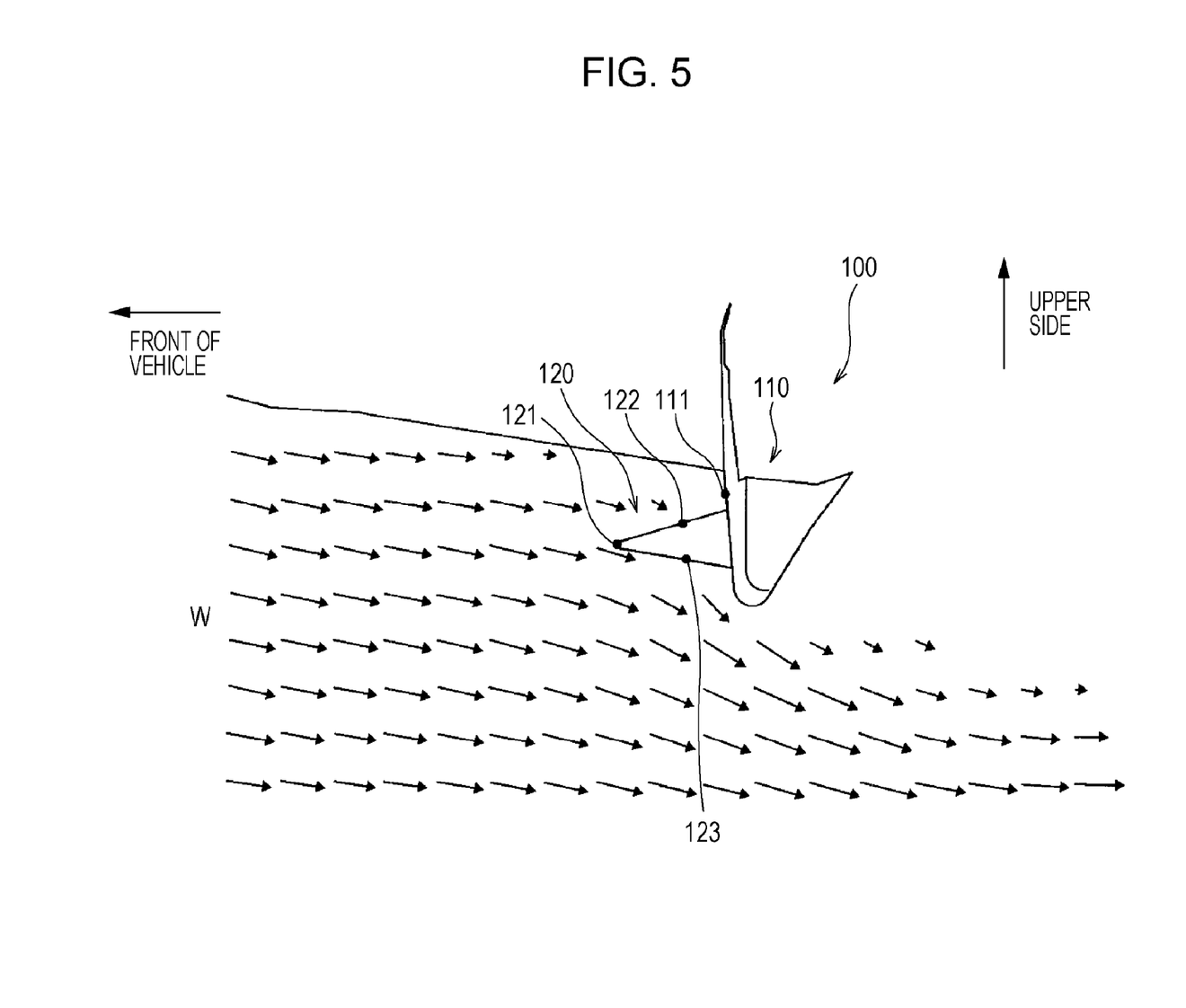
FIG. 5 is a side view illustrating the velocities and the directions of the airflow with the airflow deflector apparatus for a vehicle of the embodiment in a state seen from a lateral direction of the vehicle.

The front surface portion 111 is a central portion when the flap portion 110 is seen from the front of the vehicle 1, and formed so as to have a substantially planar shape (in practice, the front surface portion 111 may be curved to such a degree as to have aerodynamic characteristics substantially the same as those of a planar surface). As illustrated in FIG. 5, the front surface portion 111 is slightly inclined such that a lower end portion thereof is disposed behind an upper end portion thereof. However, the front surface portion 111 is disposed such that the normal line thereof extends substantially along the longitudinal direction of the vehicle 1.

The inner end portion 112 and the outer end portion 113 are respectively positioned at the inner side and the outer side on the front surface portion 111 in the lateral direction of the vehicle 1. The surfaces of the inner end portion 112 and the outer end portion 113 are curved to form smooth convex surfaces that continue from the front surface portion 111 to the side surface portions.

As illustrated in FIG. 2, the inner end portion 112 is disposed inside the inner end portion of the front wheel 2 in the lateral direction of the vehicle 1.

The outer end portion 113 is disposed in front of a wheel tread of the front wheel 2.

The protrusion portion 120 is formed so as to protrude from the central portion of the front surface portion 111 of the flap portion 110 toward the front side of the vehicle 1. That is, as seen from the front of the vehicle 1, the front surface portion 111 is disposed so as to surround the protrusion portion 120.

As illustrated in the drawings such as FIG. 3, the protrusion portion 120 is formed so as to extend along the lateral direction of the vehicle 1 and to have a substantially square pyramid shape with each corner thereof rounded. The protrusion portion 120 includes a protrusion end portion 121 that is the apex of the square pyramid, and is formed into a tapering shape such that the protrusion end portion 121 side (front side of the vehicle 1) thereof is thinner than a base portion (flap portion 110 side or a rear side of the vehicle 1) thereof.

The protrusion end portion 121 has a front end portion that is rounded into a convex surface shape go as to reduce drag by allowing airflow W to smoothly flow.

The protrusion end portion 121 of the protrusion portion 120 is disposed at or close to a position where the airflow W (relative wind) striking the airflow deflector apparatus 100 flows in a direction substantially perpendicular to the front surface portion 111 of the flap portion 110. Such a position substantially matches a position where drag received by the flap portion 110 is at the maximum if the protrusion portion 120 is not provided.

When an area where the airflow W (relative wind) flows in the direction substantially perpendicular to the front surface portion 111 of the flap portion 110 is distributed in a certain range, the protrusion end portion 121 is suitably disposed at or close to a position where the velocity component in the perpendicular direction is at the maximum.

Figure 4:
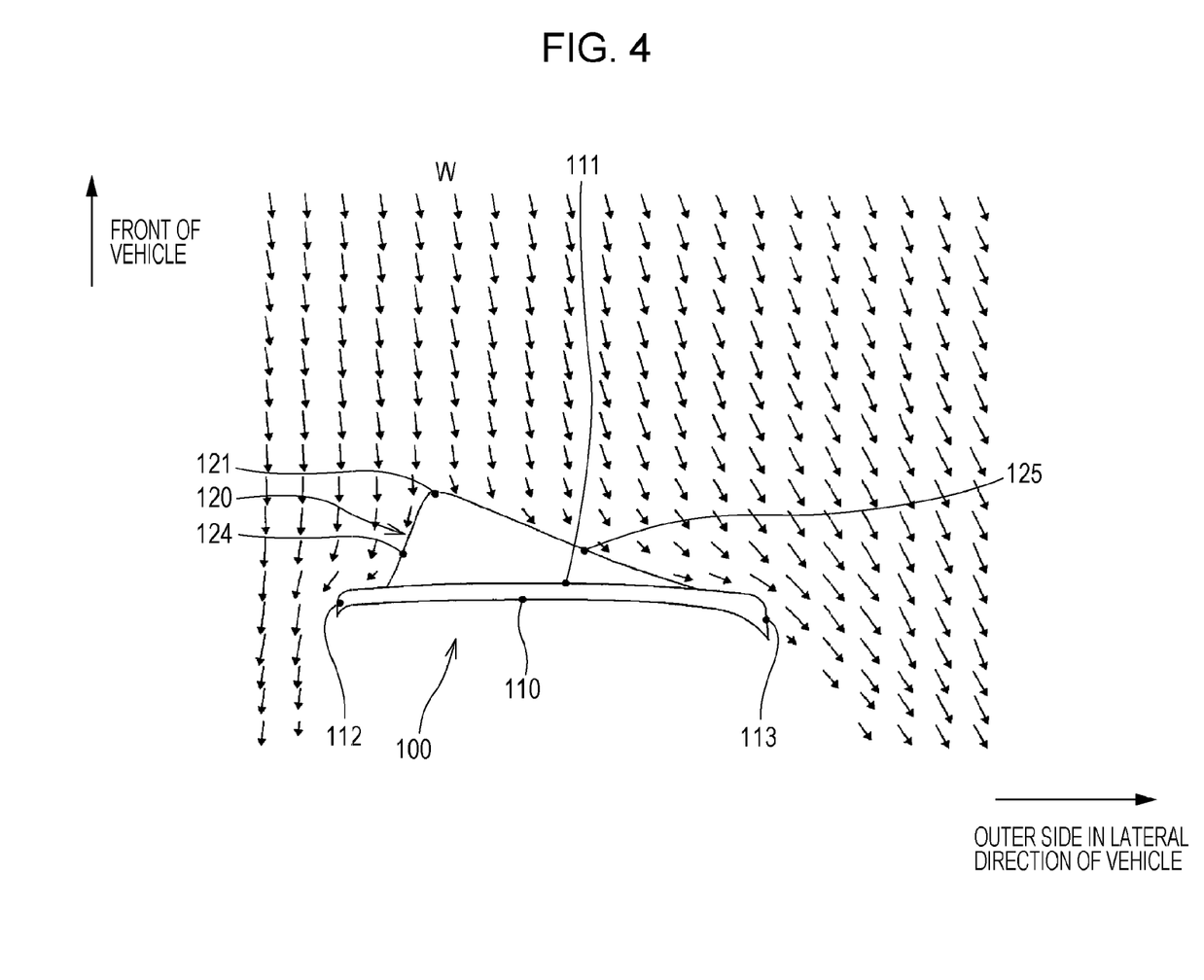
FIG. 4 is a plan view illustrating the velocities and the directions of the airflow with the airflow deflector apparatus for a vehicle of the embodiment in a state seen from the lower side.

As illustrated in drawings such as FIGS. 3 and 4, the protrusion end portion 121 is disposed at a position that is inwardly offset in the lateral direction of the vehicle 1 relative to the central portion of the protrusion portion 120 in the lateral direction of the vehicle 1.

As the amount of protrusion (the amount of advancement) of the protrusion end portion 121 from the front surface portion 111 of the flap portion 110 is increased, the effect of reducing drag increases in order to reduce air resistance of the vehicle 1, and accordingly, in order to significantly improve the fuel consumption rate, the protrusion amount is desirably set to, for example, 50 mm or larger.

The protrusion portion 120 further includes an upper surface portion 122, a lower surface portion 123, an inner side surface portion 124, and an outer side surface portion 125.

The upper surface portion 122 connects an upper portion of the protrusion end portion 121 to the front surface portion 111 of the flap portion 110, and is inclined relative to a horizontal plane such that the level of a rear end portion thereof is disposed above the level of a front end portion thereof.

The lower surface portion 123 connects a lower portion of the protrusion end portion 121 to the front surface portion 111 of the flap portion 110, and is inclined relative to the horizontal plane such that the level of a rear end portion thereof is below the level of a front end portion thereof.

The inner side surface portion 124 connects an inner end portion of the protrusion end portion 121 in the lateral direction of the vehicle 1 to the front surface portion 111 of the flap portion 110, and is inclined relative to the longitudinal direction of the vehicle 1 such that a rear end portion thereof is disposed inside a front end portion thereof in the lateral direction of the vehicle 1.

The outer side surface portion 125 connects an outer end portion of the protrusion end portion 121 in the lateral direction of the vehicle 1 to the front surface portion 111 of the flap portion 110, and is inclined relative to the longitudinal direction of the vehicle 1 such that a rear end portion thereof is disposed outside an front end portion thereof in the lateral direction of the vehicle 1.

Boundary portions where adjacent surface portions out of the above-described upper surface portion 122, the lower surface portion 123, the inner side surface portion 124, and the outer side surface portion 125 contact each other are rounded so as to form smooth convex surfaces.

In addition, boundary portion where the upper surface portion 122, the lower surface portion 123, the inner side surface portion 124, and the outer side surface portion 125 contact an area equivalent to a foot on the front surface portion 111 of the flap portion 110 is rounded so as to form a smooth concave surface.

Next, functions of the airflow deflector apparatus 100 will be described. It is noted that the velocity of the airflow W in the description below refers to a relative velocity with reference to the vehicle body of the vehicle 1.

As illustrated in FIG. 4, the airflow deflector apparatus 100 has a function that receives the airflow W (relative wind) flowing from the front side of the vehicle 1 and changes the moving direction of the airflow W such that the airflow W flows toward the inner and the outer sides in the lateral directions of the vehicle 1.

With respect to part of the airflow W that flows from the protrusion end portion 121 of the protrusion portion 120 along the inner side surface portion 124, the velocity component toward the rear side of the vehicle is reduced by the front surface portion 111 of the flap portion 110, and the airflow W is redirected toward the inner side in the lateral direction of the vehicle 1 so as to increase the velocity component thereof toward the inner side in the lateral direction of the vehicle 1. This suppresses the airflow that directly strikes the front wheel 2 and the lower arm 3.

With respect to part of the airflow W that flows from the protrusion end portion 121 of the protrusion portion 120 along the outer side surface portion 125, the velocity component toward the rear side of the vehicle 1 is reduced by the front surface portion 111 of the flap portion 110, and the airflow W is redirected toward the outer side in the lateral direction of the vehicle 1 so as to increase the velocity component thereof toward the outer side in the lateral direction of the vehicle 1. This suppresses the airflow that directly strikes the front wheel 2.

As illustrated in FIG. 5, the airflow deflector apparatus 100 has a function that receives the airflow W (relative wind) flowing from the front side of the vehicle 1 and changes the moving direction of the airflow W such that the airflow W flows downward.

With respect to part of the airflow W that flows from the protrusion end portion 121 of the protrusion portion 120 along the lower surface portion 123, the velocity component toward the rear side of the vehicle 1 is reduced by the front surface portion 111 of the flap portion 110, and the airflow W is redirected downward so as to increase the downward velocity component thereof. This suppresses the airflow that directly strikes the front wheel 2 and the lower arm 3.

Part of the airflow that flows along the upper surface portion 122 of the protrusion portion 120 forms vortices (not shown) in a space between the upper surface portion 122 and a lower surface of the vehicle body. Such vortices typically cause negative pressures. Thus, the negative pressures, by acting on the front surface portion 111 of the flap portion 110, have an effect of reducing drag of the airflow deflector apparatus 100.

Advantages of the above-described embodiment will be described below by comparing the embodiment with a comparative example of the present invention, which will be described below.

In the description of the comparative example, components that are substantially similar to those in the above-described embodiment are denoted by like reference numerals and descriptions thereof are omitted.

Figure 6:
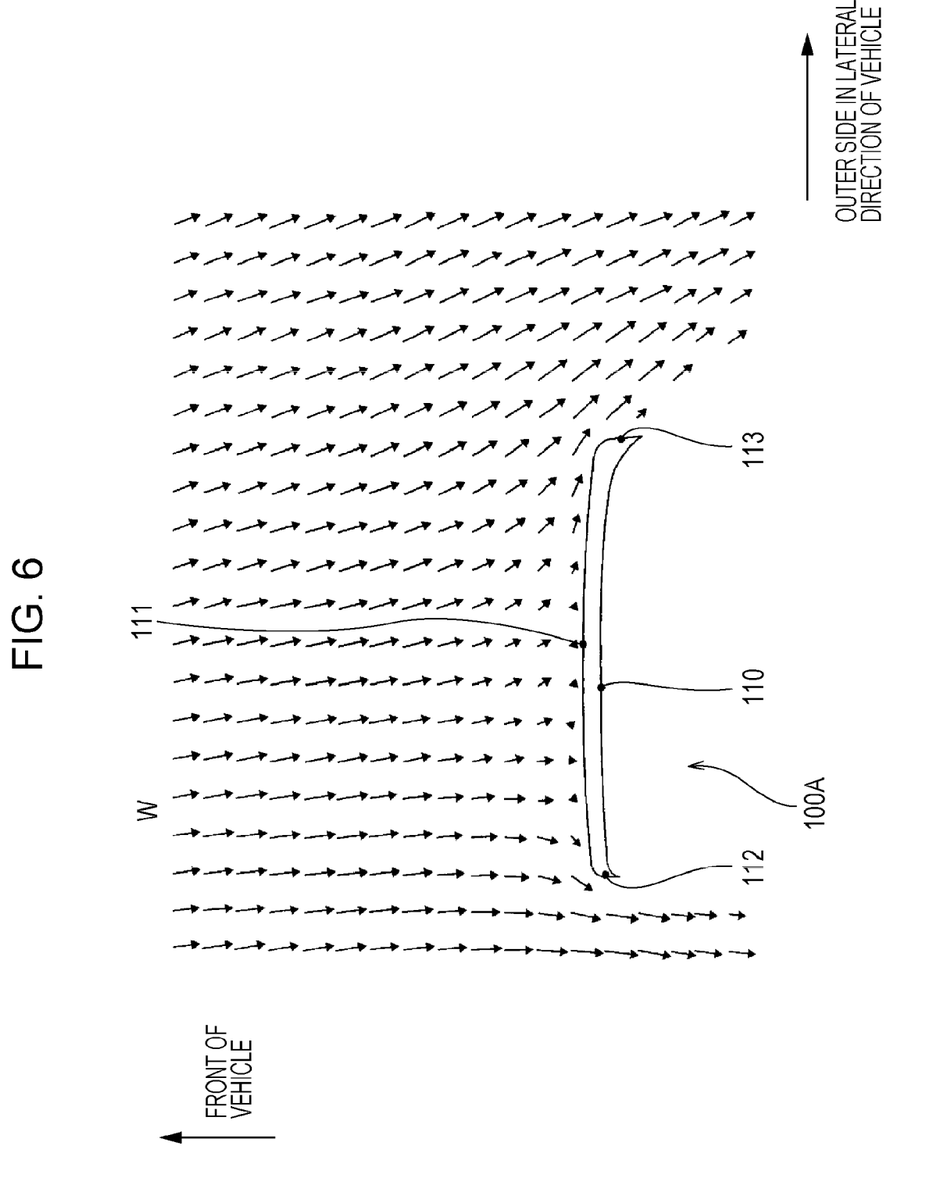
FIG. 6 is a plan view illustrating the velocities and the directions of the airflow with the airflow deflector apparatus for a vehicle of a comparative example of the present invention in a state seen from the lower side.
Figure 7:
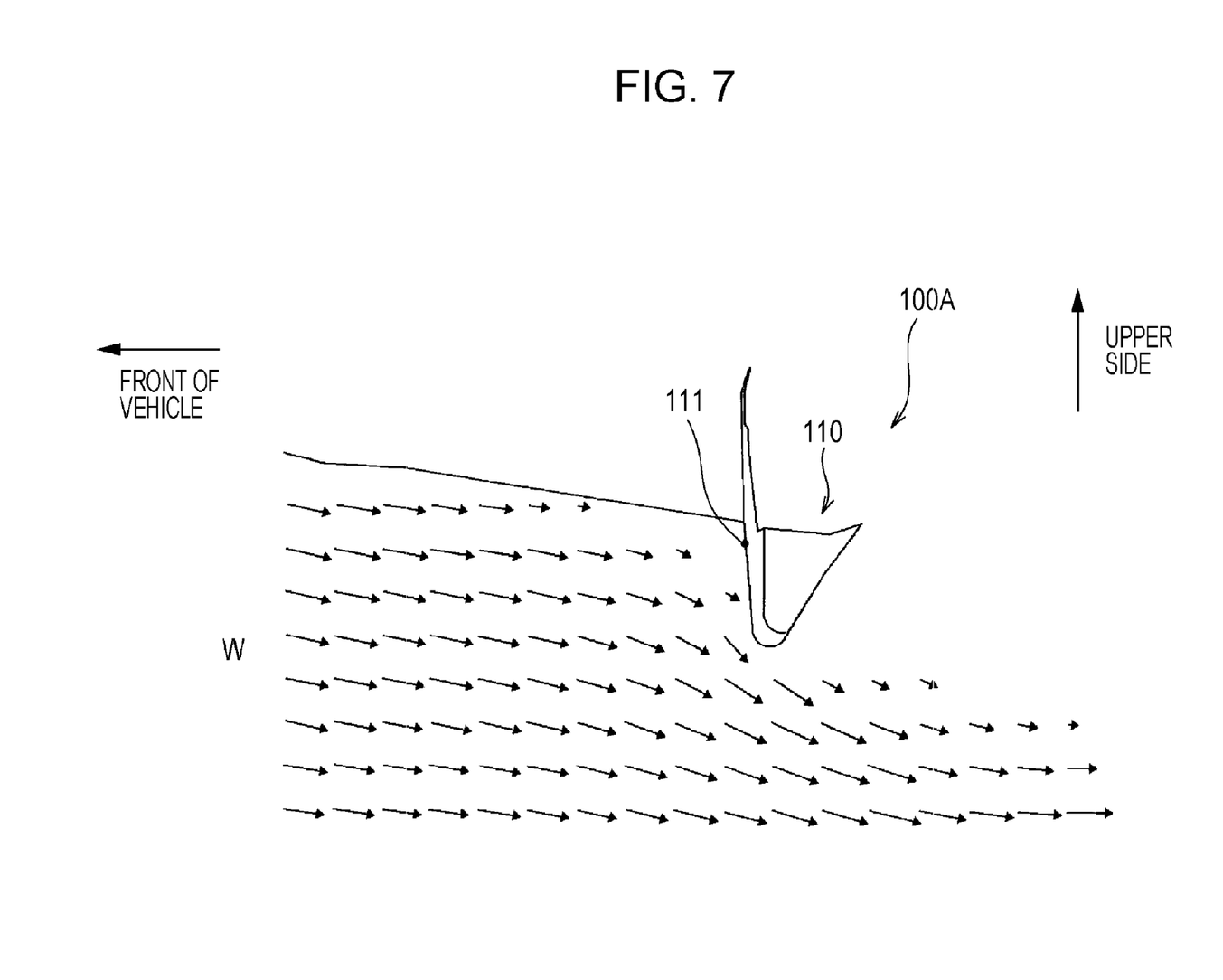
FIG. 7 is a side view illustrating the velocities and the directions of the airflow with the airflow deflector apparatus for a vehicle of the comparative example in a state seen from the lateral direction of the vehicle.
Figure 8A:
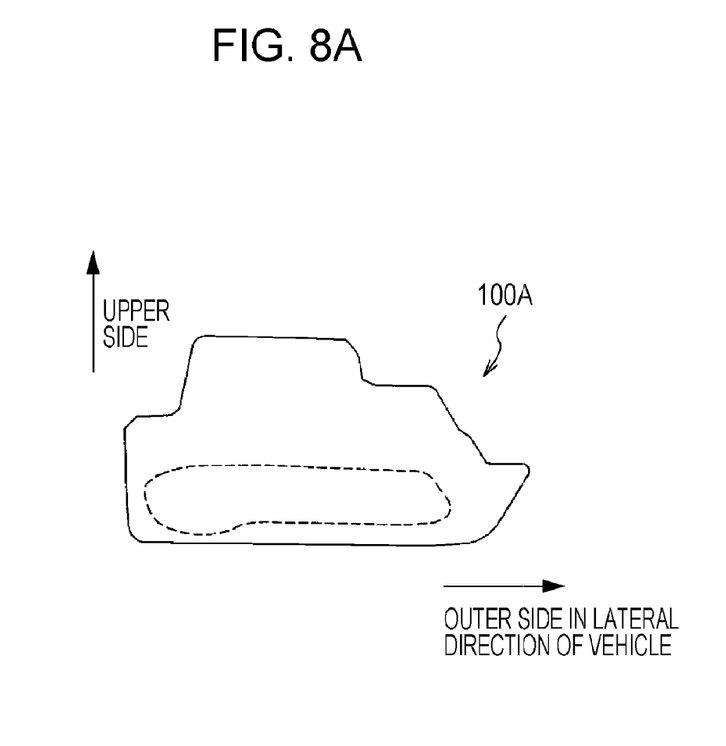
FIGS. 8A and 8B are diagrams illustrating distributions of drags (areas in which drags are larger than or equal to a specified threshold value) with the airflow deflector apparatus for a vehicle of the comparative example and with the airflow deflector apparatus for a vehicle of the embodiment, respectively.
Figure 8B:
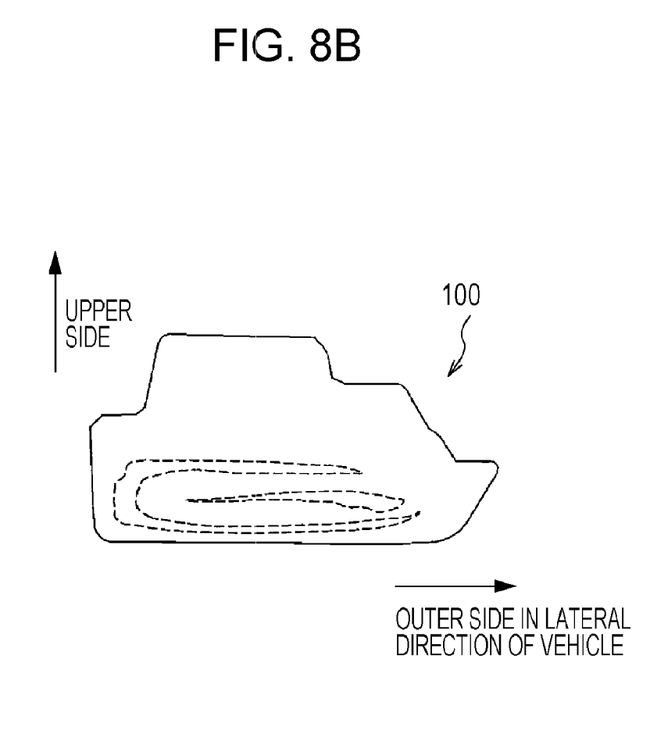

A comparative example airflow deflector apparatus 100A illustrated in FIGS. 6 to 8 is in accordance with the related art and does not include the protrusion portion 120 that is provided in the airflow deflector apparatus 100 of the embodiment.

As illustrated in FIGS. 6 and 7, with the airflow deflector apparatus 100A of the comparative example, the airflow W flowed from the front of the vehicle 1 can also be redirected, and accordingly, the airflow directly striking the front wheel 2 and the like can also be suppressed.

However, as indicated by the dashed lines in FIGS. 8A and 8B, an area in which drag of the airflow deflector apparatus 100 or the airflow deflector apparatus 100A is larger than or equal to a specified threshold value is larger with the airflow deflector apparatus 100A of the comparative example than that with the airflow deflector apparatus 100 of the embodiment. This indicates that, although air resistance of the front wheel and the like can be reduced, the airflow deflector apparatus 100A itself causes large drag, and accordingly, diminishes an effect of reducing air resistance of the whole vehicle.

In contrast, drag at a position corresponding to the protrusion portion 120 is smaller with the embodiment than that with the comparative example. This indicates that, by providing the protrusion portion 120 as above, drag of the whole airflow deflector apparatus 100 and eventually the whole vehicle 1 can be effectively reduced.

As described above, the following advantages can be obtained in accordance with the present embodiment.

(1) By including the protrusion portion 120 that protrudes from the front surface portion 111 of the flap portion 110 of the airflow deflector apparatus 100 and has a shape that tapers toward the protrusion end portion 121 side, drag caused by the airflow deflector apparatus 100 itself can be reduced.

In addition, by changing the moving direction of the airflow W flowing along the surface of the protrusion portion 120 into the lateral directions and the lower direction of the vehicle 1 using the front surface portion 111 of the flap portion 110, an increase in drag caused by direct striking of the airflow W on the front wheel 2 and the lower arm 3 can be suppressed. This, together with the above-described advantage, can effectively reduce air resistance of the vehicle 1, thereby allowing the fuel consumption rate, the maximum speed, acceleration performance at high speeds, and so forth of the vehicle 1 to be improved.

Furthermore, by providing the protrusion portion 120, the flow velocity of the airflow flowing outward from the front surface portion 111 of the flap portion 110 can be increased, thereby preventing this outward flowing airflow from interfering with main flow that flows around the airflow deflector apparatus 100, and thereby desirably forming airflow away from components disposed rearward.

(2) The protrusion end portion 121 of the protrusion portion 120 is disposed at or close to a position where the airflow W strikes the front surface portion 111 of the flap portion 110 in the substantially perpendicular direction. Thus, the protrusion end portion 121 can be provided at a position where drag is at the maximum if the protrusion portion 120 is not provided, and drag caused by the airflow deflector apparatus 100 can be effectively reduced.

(3) By forming an area around the protrusion portion 120 on the front surface portion 111 of the flap portion 110 so as to have a substantially planar shape, the airflow W that strikes the airflow deflector apparatus 100 can be significantly redirected at angles up to a substantially right angle. Thus, the effect of reducing air resistance of components disposed rearward such as the front wheel 2 and the lower arm 3 can be improved.

Modifications

The present invention is not limited to the above-described embodiment. A variety of modifications and changes can be implemented, which are also within the technical scope of the present invention.

(1) Shapes, structures, materials, manufacturing methods and so forth of the airflow deflector apparatus for a vehicle can be suitably changed. For example, the flap portion and the protrusion portion of the embodiment are integrally formed of resin by injection molding. Alternatively, the components may be separately formed and assembled together, or may be formed of a different material, for example, such as sheet metal.

In addition, the front surface portion 111 of the flap portion 110 of the embodiment is formed so as to have a substantially planar surface shape. Alternatively, for example, the front surface portion of the flap portion may be formed so as to have a concave surface that is smoothly continuous with the surface of the protrusion portion.

(2) Positions, shapes, protruding heights, and so forth of the protrusion portion can be suitably changed depending on, for example, shapes of the bumper and other components of the vehicle, the position of the airflow deflector apparatus relative to components such as wheels, of which air resistances need to be reduced, and so forth.

(3) Although the airflow deflector apparatus for a vehicle of the embodiment redirects the airflow, for example, toward the lateral sides and the lower side, directions toward which the airflow is redirected can be suitably changed. For example, the airflow may be redirected only toward one of the lateral sides of the vehicle, or only toward the lower side.

In this case, the airflow deflector apparatus may be substantially uniformly shaped along the vertical or the lateral direction of the vehicle.

(4) The airflow deflector apparatus for a vehicle of the embodiment is provided in front of the front wheel. However, the present invention is not limited to this. The airflow deflector apparatus may be provided in front of the rear wheel. In addition, a target component, of which interference with the airflow is prevented, is not limited to the wheel. The target may be a different component, for example, such as she suspension arm or the drive shaft.

What is claimed is:

1. An airflow deflector apparatus for a vehicle that protrudes downward from a vehicle body in front of a wheel housing that houses a wheel, the airflow deflector apparatus for a vehicle comprising:

a flap portion having a front surface portion extending substantially in a lateral direction of a vehicle and a vertical direction and provided in front of the wheel housing at either one of a right side and a left side of the vehicle in a moving direction of the vehicle; and a protrusion portion that protrudes toward a front of the vehicle from the front surface portion of the flap portion, the protrusion portion being formed so as to have a shape that tapers toward a protrusion end portion thereof, wherein the front surface portion has a central portion and a peripheral portion that surrounds the central portion, the protrusion portion protrudes from the central portion and is surrounded by the peripheral portion, and the front surface portion of the flap portion, when the vehicle is running, changes a moving direction of airflow that flows along a surface of the protrusion portion into a direction away from components that are disposed rearward.

2. The airflow deflector apparatus for a vehicle according to claim 1, wherein the front surface portion of the flap portion, when the vehicle is running, changes the moving direction of the airflow flowing along the surface of the protrusion portion so as to increase at least one of a velocity component toward an outer side in the lateral direction of the vehicle, a velocity component toward an inner side in the lateral direction of the vehicle, and a velocity component toward a lower side.

3. The airflow deflector apparatus for a vehicle according to claim 1,
wherein the protrusion end portion of the protrusion portion is disposed at or close to a position where airflow flows in a direction that is substantially perpendicular to the front surface portion of the flap portion.

4. The airflow deflector apparatus for a vehicle according to claim 2,
wherein the protrusion end portion of the protrusion portion is disposed at or close to a position where airflow flows in a direction that is substantially perpendicular to the front surface portion of the flap portion.

5. The airflow deflector apparatus for a vehicle according to claim 1,
wherein an area around the protrusion portion on the front surface portion of the flap portion is formed so as to have a substantially planar shape.

6. The airflow deflector apparatus for a vehicle according to claim 2,
wherein an area around the protrusion portion on the front surface portion of the flap portion is formed so as to have a substantially planar shape.

7. The airflow deflector apparatus for a vehicle according to claim 3,
wherein an area around the protrusion portion on the front surface portion of the flap portion is formed so as to have a substantially planar shape.

8. The airflow deflector apparatus for a vehicle according to claim 1,
wherein the protrusion end portion is an apex of the protrusion portion.

* * * * *